United States Patent [19]

Melquist

[11] Patent Number: 5,189,115

[45] Date of Patent: Feb. 23, 1993

[54] POLYETHERIMIDE COPOLYMERS

[75] Inventor: John L. Melquist, Naperville, Ill.

[73] Assignee: Amoco Corporation, Chicago, Ill.

[21] Appl. No.: 613,401

[22] Filed: Nov. 15, 1990

Related U.S. Application Data

[63] Continuation-in-part of Ser. No. 312,741, Feb. 21, 1989, abandoned.

[51] Int. Cl.$^5$ ............... C08F 283/04; C08L 77/00
[52] U.S. Cl. ........................... 525/420; 525/425; 528/353; 528/350
[58] Field of Search ........... 528/353, 350; 525/420, 525/425

[56] References Cited

U.S. PATENT DOCUMENTS

| | | | |
|---|---|---|---|
| 4,888,407 | 12/1989 | Yasuhisa et al. | 528/353 |
| 4,987,218 | 1/1991 | Malinge et al. | 528/353 |
| 5,068,307 | 11/1991 | Hara et al. | 528/353 |

*Primary Examiner*—John Kight, III
*Assistant Examiner*—Duc Truong
*Attorney, Agent, or Firm*—Rae K. Stuhlmacher; Wallace L. Oliver; Frank J. Sroka

[57] ABSTRACT

Novel polyetherimide copolymers comprising the reaction product of 2,2-bis(3',4'-dicarboxyphenyl)propane dianhydride, an aromatic bis(ether anhydride), and a diamine are described. The polyetherimide copolymers have improved thermal properties, are soluble in conventional solvents, and are compatible with other engineering resins.

6 Claims, No Drawings

POLYETHERIMIDE COPOLYMERS

RELATED APPLICATION

This application is a continuation-in-part of copending patent application Ser. No. 312,741, filed Feb. 21, 1989, now abandoned, fully incorporated herein by reference.

FIELD OF THE INVENTION

This invention relates to polyetherimide copolymers. More particularly, the present invention relates to polyetherimide copolymers comprising imide units derived from the 2,2-bis(3',4'-dicarboxyphenyl)propane dianhydride (hereinafter referred to as IPAN).

BACKGROUND OF THE INVENTION

Polyimides generally have high thermal stability and excellent mechanical properties. Uses for this class of polymers include high temperature molding resins, fibers, films, and composite applications. Although there are a number of applications, the development of polyimides has been retarded because they are often difficult to process. Polyimides made from diether dianhydrides have good processability, but their glass transition temperatures (Tg's) are too low for many high performance applications. Copolyimides containing both diether dianhydrides and other dianhydrides such as pyromellitic dianhydride have been shown to have higher glass transition temperatures than do homopolyimides containing only the diether dianhydrides. However, these copolyimides are often insoluble in conventional solvents, such as N-methylpyrrolidinone (NMP), which limit their utility in fiber, film, and composite applications where the solubility of the polyimide is advantageous.

The polyetherimide copolyimides of the present invention can be prepared as the reaction product of 2,2-bis(3,4-dicarboxyphenyl)propane (IPAN), one or more aromatic bis(ether anhydrides), and one or more diamines. The polyetherimides of the present invention have higher glass transition temperatures (Tg's) than polymers made from diether dianhydrides and diamines alone and have better solubility in conventional solvents, such as NMP, than copolyimides made from mixtures of diether dianhydrides and other dianhydrides such as pyromellitic dianhydride. In addition, the copolyimides of this invention are mechanically compatible with other engineering resins.

SUMMARY OF THE INVENTION

The polyetherimide copolymers of the present invention comprise recurring units corresponding to Formula (I) and, in addition, recurring units of Formula (II),

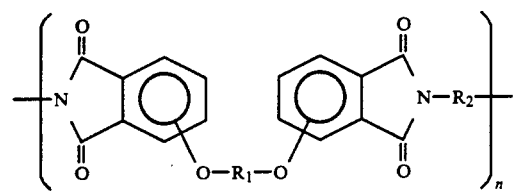

(I)

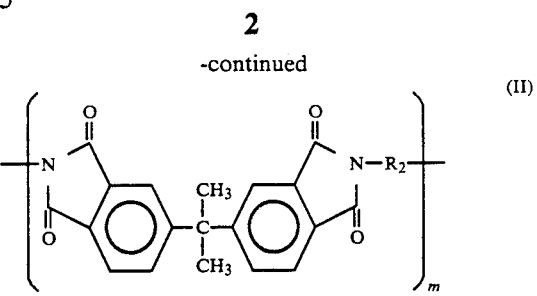

(II)

wherein
n and m are at least one and the group —O—R$_1$—O— is attached to the 3 or 4 and 3' or 4' positions;

R$_1$ is selected from a substituted or unsubstituted divalent aromatic radical of the formula

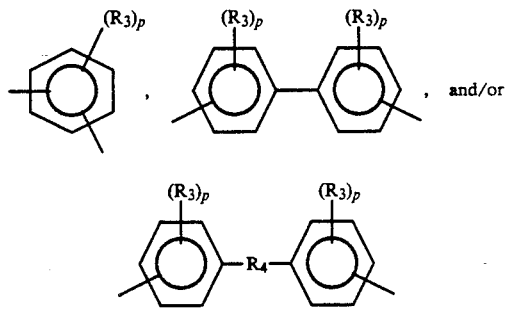

, and/or wherein p is from zero to 4 and, R$_3$ is independently a monovalent C$_1$ to C$_6$ alkyl, aryl, or halogen;

R$_4$ is selected from —O—, —S—,

—SO$_2$—, —SO—, C$_1$ to C$_6$ alkylene, C$_4$ to C$_8$ cycloalkylene, C$_1$ to C$_6$ alkylidene; and R$_2$ is selected from a divalent C$_6$ to C$_{20}$ hydrocarbon radical, including halogenated or C$_1$ to C$_6$ alkyl-substituted derivatives thereof, C$_2$ to C$_{20}$ alkylene and cycloalkylene radicals, C$_2$ to C$_8$ alkylene-terminated polydiorganosiloxane, or a divalent radical of the formula

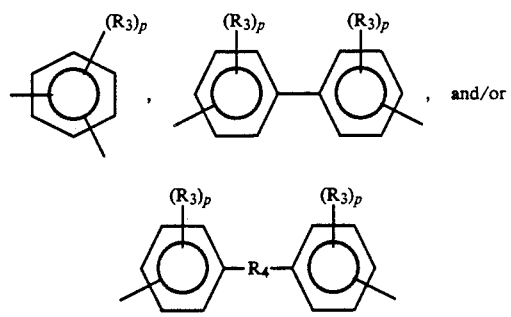

, and/or wherein p, R$_3$, and R$_4$ are as previously defined.

The polyetherimide copolymers of the present invention have improved thermal properties over polymers which do not contain IPAN (see Example 1 and Comparative Example A). The copolymers of the present invention are soluble in solvents, such as NMP (see Example 1 and Comparative Example A), and can be processed into films, fibers, and composites. Further, the copolymers of the present invention are compatible with other engineering resins and can be prepared as blends having properties tailored for specific applications (see Example 3).

The polyetherimide copolymers of the present invention can be used in a variety of applications, such as films for the electronic industry, fibers, and as matrix resins for composites.

BRIEF DESCRIPTION OF THE INVENTION

Briefly, the polyetherimide copolymers of the present invention can be prepared as the polymeric condensation product of 2,2-bis(3',4'-dicarboxyphenyl) propane dianhydride of Formula (III) (IPAN), at least one aromatic bis(ether anhydride) of Formula (IV), and at least one diamine of Formula (V),

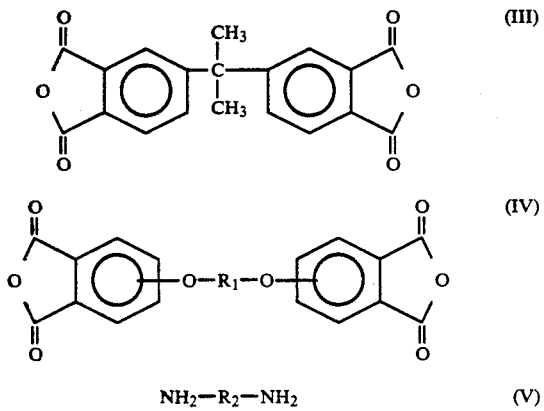

$$NH_2-R_2-NH_2 \qquad (V)$$

wherein $R_1$ and $R_2$ are as previously defined.

Suitable aromatic bis(ether anhydrides) of Formula (IV) include, for example, 2,2-bis[4-(2,3-dicarboxyphenoxy)phenyl]propane dianhydride,
4,4'-bis(2,3-dicarboxyphenoxy)diphenyl ether dianhydride,
1,3-bis(2,3-dicarboxyphenoxy)benzene dianhydride,
4,4'-bis(2,3-dicarboxyphenoxy)diphenyl sulfide dianhydride,
1,4-bis(2,3-dicarboxyphenoxy)benzene dianhydride,
4,4'-bis(2,3-dicarboxyphenoxy)benzophenone dianhydride,
4,4'-bis(2,3-dicarboxyphenoxy)diphenyl sulfone dianhydride,
2,2,-bis[4-(3,4-dicarboxyphenoxy)phenyl]propane dianhydride,
4,4'-bis(3,4-dicarboxyphenoxy)diphenyl ether dianhydride,
4,4'-bis(3,4-dicarboxyphenoxy)diphenyl sulfide dianhydride,
1,3-bis(3,4-dicarboxyphenoxy)benzene dianhydride,
1,4-bis(3,4-dicarboxyphenoxy)benzene dianhydride,
4,4'-bis(3,4-dicarboxyphenoxy)benzophenone dianhydride,
4,4'-bis(2,3-dicarboxyphenoxy)diphenyl dianhydride,
4,4'-bis(3,4-dicarboxyphenoxy)diphenyl dianhydride,
4-(2,3-dicarboxyphenoxy)-4'-(3,4-dicarboxyphenoxy) dianhydride, and the like.

Suitable diamines of Formula (V) include, for example,
m-phenylenediamine,
p-phenylenediamine,
2,2-bis(p-aminophenyl)propane,
4,4'-diaminodiphenyl-methane,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine; and the like.

In addition, one may use more than one dianhydride (or mixture of dianhydrides) of Formula (IV), and more than one diamine (or mixture of diamines) of Formula (V).

The polyetherimide copolymers of the present invention are prepared by methods well-known in the art as set forth in, for example, U.S. Pat. Nos. 3,833,544, 3,887,588, 4,017,511, 3,965,125 and 4,024,110, incorporated herein by reference.

In general, the polyetherimide copolymers can be prepared by mixing IPAN and at least one dianhydride, or mixture of dianhydrides, of Formula (IV) with at least one diamine, or mixture of diamines, of Formula (V) in a compatible solvent or mixture of solvents such as, for example, N-methyl-pyrrolidinone (NMP), o-dichlorobenzene, m-cresol/toluene, or N,N-dimethylacetamide. The reaction generally takes place at from about minus 10° C. to about 250° C.

Alternatively, the polyetherimide copolymers can be prepared by melt polymerization of IPAN and a second dianhydride, or mixture of dianhydrides, of Formula (IV) with a diamine, or mixture of diamines, of Formula (V). In this case, a mixture of dianhydride and diamine is heated with mixing under conditions of controlled time, temperature, and pressure to remove the water and effect polymerization. The temperature and pressure conditions will vary according to the particular polymer composition being prepared. However, it is preferred that the temperature and pressure conditions are arranged to avoid decomposition of the monomers. Melt polymerization temperatures are generally between about 200° C. and about 400° C., and typically between about 230° C. to about 380° C.

In somewhat greater detail, copolymers of this invention are preferably made by dissolving isopropylidenebis-(phthalic anhydride) (IPAN) in a polar aprotic solvent, such as NMP or N,N-dimethylacetamide, and adding the dianhydride and the diamine at a temperature between about minus 10° C. and 250° C., preferably in a range from about ambient temperature to about 100° C., to make a solution of polyamic acid. The polyamic acid is then imidized by either chemical or thermal methods to form the polyetherimide.

Chemical imidization is generally accomplished using dehydrating agents, such as, for example, acetic anhydride or trifluoro-acetic anhydride. Other examples of suitable dehydrating agents can be found in Bessonov, M. I. et al., Polyimides—Thermally Stable Polymers, Consultants Bureau, New York, 76–82 (1987), incorporated herein by reference. A particularly suitable chemical imidization composition is the dehydrating agent, acetic anhydride, used in the presence of a catalyst such as pyridine. Also preferred are 1,3-dicyclohexylcarbodiimide (DCC), thionyl chloride, phosphorus trichloride, trifluoroacetic anhydride, and the like.

In addition to acetic anhydride, lower fatty acid anhydrides and aromatic monobasic acid anhydrides may be used. Suitable lower fatty acid anhydrides include propionic, butyric, valeric, and the like. Suitable aromatic monobasic acid anhydrides include the anhydride of benzoic acid and those of the following acids: o-, m-, and p-toluic acids; m- and p-ethyl benzoic acids; p-propyl benzoic acid; p-isopropyl benzoic acid; anisic acid; o-, m- and p-nitro benzoic acids; o-, m-, and p-halo benzoic acids; the various dibromo and dichloro benzoic acids; the tribromo and trichloro benzoic acids; and the like.

Thermal imidization is typically accomplished by exposing the polyamic acid to an elevated temperature, generally in a range of from about 150° C. to about 400° C. Imidization can also be performed by heating the poly(amide-acid) solution to temperatures at or above 200° C. at reflux to remove the water which is a by-product of the reaction. Additionally, a catalyst, such as p-toluenesulfonic acid, and/or an azeotroping agent, such as monochlorobenzene, can be added to assist the thermal imidization.

In general, no added catalysts are required to produce the polyetherimide copolymers of the present invention. However, catalysts may be added to provide certain advantages, for example, to increase the speed of reaction. Examples of such catalysts are metal phosphite and hypophosphite salts, for example, sodium hypophosphite.

The mole ratio of IPAN to the diether dianhydride can vary from about 0.05–95:95–0.05 when compared to the dianhydride moieties. However, the polymer attribute that is required for a particular end use, such as blend compatibility, will determine the mole ratio of components that are necessary to achieve a particular attribute. In other words, the preferred mole ratio will vary depending on the desired polymer attribute. Still, polyetherimide copolymer compositions comprising even minor proportions of IPAN provide superior thermal properties and solubility relative to the compositions lacking in IPAN.

Generally, the desired properties of the polyetherimide copolymers of the present invention are more pronounced when the copolymer contains a range of from about 20 to about 80 mole percent IPAN. In addition, the resulting copolymers may have any desired molecular architecture, for example, random, random-block, block, and the like.

Generally, in preparation of the polyetherimides of the present invention, the total dianhydrides and total diamines are present in approximately equivalent amounts so that the resulting polyetherimide copolymer has a high molecular weight. However, by using an excess of diamine or dianhydride in the reaction mixture, the chain length of the product can be adjusted. Further, the chain length can be restricted by adding a predetermined quantity of a monoamine or a monocarboxylic acid anhydride.

Typically, the chain length is restricted by adding a predetermined quantity of a monoamine or a monoanhydride or other suitable chain-terminating agent to the reaction mixture. For example, a slight molar excess (about 1 to 5 mol percent) of total diamine can be employed resulting in the production of polyetherimides having terminal amine groups. Suitable chain-terminating agents are monoanhydrides or monoamines such as phthalic anhydride, aniline, p-methylaniline, and the amine and anhydride shown below:

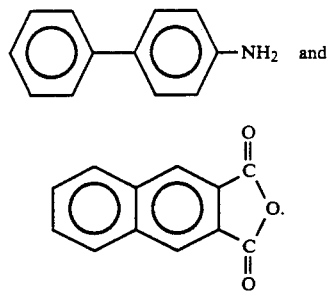

Generally, useful polyetherimide copolymers have an intrinsic viscosity (IV) greater than 0.2 deciliters per gram (dl/g), preferably 0.35 to 0.7 dl/g (measured at a concentration of 0.5 g/dl in NMP at 30° C.). It has been found that when the IV is below approximately 0.2 dl/g the polymer can be brittle, and when above approximately 0.7 dl/g the higher viscosity begins to affect the melt processability of the polymer.

Additives which are conventionally used in the manufacture of polyetherimide copolymers can be added to the polycondensation mixture before, during, or after the polycondensation process. Many of these additives can also be rolled into or extruded with the polymer by extrusion compounding or other suitable methods. Suitable additives are, for example, light and heat stabilizers, which can include aromatic amines, such as diphenylamine; phosphoric compounds, such as phosphoric acid; and/or soluble metal compounds, including copper or manganese; colorants; optical brighteners; plasticizers; mold-release agents; flame-retardant agents; reinforcing fibers, such as glass, graphite, boron, ceramic, or aramid; and mineral fillers.

Typically, additives which may be used with the polyetherimide copolymer of the present invention include reinforcement fibers, such as aramid, boron, carbon, graphite, and glass. Glass fiber is the most widely used reinforcement in the form of chopped strands, ribbon, yarn, filaments, or woven mats. Reinforcing fillers can include wollastonite, asbestos, talc, alumina, clay, mica, glass beads, fumed silica, gypsum, graphite powder, molybdenum disulfide and the like. Mixtures of reinforcing and non-reinforcing fillers may be used, such as a mixture of glass fibers and talc or wollastonite. The reinforcing fillers are used in amounts of from about 10 to about 80 weight percent, whereas the non-reinforcing fillers are used in amounts of up to 50 weight percent. Other additives include stabilizers, pigments, flame retardants, plasticizers, processing aids, coupling agents, lubricants, mold release agents, and the like. These additives are used in amounts which achieve the desired result.

Additives can constitute up to about 65 weight percent of the polyetherimide. However, these additives are generally added in an amount which is sufficient to provide, for example, reinforcement without affecting the processability of the polymer. For example, glass fibers used as reinforcement are typically included in the range of about 10 to about 50 weight percent.

The polyetherimide copolymers of the present invention can be mixed (by extrusion compounding or other suitable methods) to form compatible alloys (or blends) with one or more engineering resins, such as polyarylates, poly(arylate-carbonates), poly(arylether sulfones), and poly(arylether ketones). Typically, the end use for the polymer blend will determine the weight ratio of the components of the blend that are necessary to provide a polymer that is suitable for a particular end use, for example, films, fibers, or molding. In other words, the preferred weight ratio will vary depending on the desired polymer attribute. Broadly, from 1 to 99 weight percent of the polyetherimide copolymer of the present invention is used to form the blend.

Typically, the blends of this invention are prepared by conventional mixing methods. For example, the polymer components are mixed with each other and any other optional ingredients in powder or granular form in an extruder. The mixture is extruded into strands. The strands are chopped into pellets, and the pellets are molded into the desired article.

Examples of suitable poly(arylethersulfones) include:

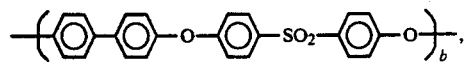

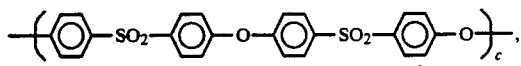

and the like.

The polyetherimide copolymers and blends thereof may be fabricated into any desired shape, i.e., molding, coating, films, or fibers and are well-suited for use in the manufacture of a wide range of fabricated articles, such as films, sheets, laminates, fibers, and molded articles. Solutions of the polyetherimide copolymers can be cast to form thin films. The polyetherimide copolymers and blends thereof can be melt-fabricated, for example, into film and injection-molded into parts using standard injection-molding machinery and methods. They are particularly useful in blends with a variety of other polymers, in particular with polyarylates, poly(arylatecarbonates), poly(arylether sulfones), and poly(arylether ketones).

The foregoing may be better understood by reference to the following examples which are provided for illustration and not limitation of the practice of the invention.

EXAMPLES 2,2-Bis(3,4-dicarboxyphenyl)propane dianhydride (IPAN) can be made according to the procedure described in U.S. Pat. No. 2,712,543, and BPAPAN can be made according to the procedure described in U.S. Pat. No. 3,956,320.

Experimental specimens obtained from the examples below were tested by a variety of techniques. All mechanical property tests were performed on specimens taken from (4)×(4)×(0.02)-inch compression-molded plaques. The test specimens were cut from the plaques and had the nominal dimensions: 4 in. length by ⅛ in. width by 0.02 in. thickness. The tensile modulus was measured using the 1% secant method according to a procedure similar to ASTM D-638. Tensile strength and elongation at break were measured according to ASTM D-638.

Pendulum impact strength was measured with a steel pendulum, cylindrical in shape, with a diameter of 0.83 inches and weighing 1.5621 pounds; the striking piece, mounted almost at the top of the pendulum was a cylinder 0.3 inches in diameter; film specimens, 4 inches long 0.125 inches wide and about 1 to 30 mils thick was clamped between the jaws of the tester so that the jaws were spaced 1 inch apart; the 0.125-inch width of the film was mounted vertically; the pendulum was raised to a constant height to deliver 1.13 foot pounds at the specimen; when the pendulum was released, the cylindrical striking piece hit the specimen with its flat end, breaking the film, and traveling to a measured height beyond; the difference in the recovery height (i.e., the difference in the potential energy of the pendulum at the maximum point of the upswing) represented the energy absorbed by the specimen during the rupture; the impact strength, expressed in foot pounds per cubic inch, (ft. lbs./in$^3$) was obtained by dividing the pendulum energy loss by the volume of the specimen.

Glass transition temperature (Tg) was determined by differential scanning calorimetry (DSC) on samples weighing 10–20 mg. in aluminum pans and using a heating rate of 20° C./min. The unit used for this test was a DuPont Model 910 thermal analyzer controlled by an Omnitherm Advantage II controlling system.

Tg's were also determined by dynamic mechanical thermal analysis (DMTA) which was performed on ⅛ in. wide × 0.02 in. thick pieces cut from the compression molded plaques described earlier. The glass transition temperature for the purpose of this test was defined in the maximum in the loss tangent curve. The instrument used for this test was a Polymer Laboratories Dynamic Mechanical Thermal Analyzer employing tensile strain at a rate of 1 Hz (see Table I).

EXAMPLE 1

BPAPAN/IPAN/mPDA 2.31 g of m-phenylene diamine (mPDA; 0.0214 mole), 5.57 g of 2,2-bis(3,4-dicarboxyphenoxyphenyl)propane dianhydride (BPAPAN; 0.0107 mole), and 3.60 g of isopropylidenebis(phthalic anhydride) (IPAN; 0.0107 mole) were weighed into a 200 ml Bantamware reaction vessel. The IPAN/BPAPAN/mPDA molar ratio was 0.5:0.5:1.0. After the vessel plus starting materials had been purged with nitrogen, 100 ml of N-methylpyrrolidone (NMP) which had been cooled in an ethylene glycol/dry ice bath were added using a cannula. The mixture was stirred and allowed to warm to room temperature. The stirring was continued for 4 hours at which time a sample of the polyamic acid solution was withdrawn to allow a determination of the inherent viscosity of this intermediate. To convert the polyamic acid to the polyimide, 4.45 ml of pyridine and 4.45 ml of acetic anhydride were added to the solution. The stirring was continued overnight, after which a sample of the solution was withdrawn, diluted with NMP, and used to determine the inherent viscosity of the polyimide. The product was recovered by precipitating in methanol in a blender, filtering, refluxing in methanol, and drying overnight in a vacuum oven at 138° C.

Inherent viscosities (IV) were determined at 30° C. in NMP solution using a polymer concentration of 0.5 g/dl. The IV's of the polyamic acid and polyimide of this example were 0.74 and 0.60 dl/g, respectively.

Evaluation by DSC in nitrogen at a heating rate of 20° C./min indicated that the glass transition temperature (Tg) of the polyimide was 244° C.

The thermal decomposition temperatures were determined by a Thermal Gravimetric Analyzer (TGA) attachment with a model 9900 thermal analyzer (available from E. I. DuPont de Nemours & Company, Wilmington, Del.) at a heating rate of 10° C./min. Under a nitrogen atmosphere, the start of catastrophic degradation was at 494° C., 1% additional weight loss was at 516° C., and 10% additional weight loss was at 540° C. Under air, the start of catastrophic degradation was at 446° C., 1% additional weight loss was at 470° C., and 10% additional weight loss was at 540° C. Measurements were made on the polymer as prepared.

By way of comparison, Polyimides, Takekoshi, Advances in Polymer Science, 94 (New Polymer Materials), Springer-Verlag, 9(1990), indicates that the Tg of a BPAPAN/mPDA resin was only 217° C., and the TGA weight loss (1%) in air at a heating rate of 10° C./min was only 460° C. Thus, a IPAN/BPAPAN/mPDA copolymer of the present invention exhibits a superior Tg and a superior TGA when compared to a polyetherimide not incorporating the IPAN dianhydride.

COMPARATIVE EXAMPLE A

BPAPAN/PMDA/mPDA 0.24 g of m-phenylene diamine (mPDA; 0.0022 mole), 0.88 g 2,2-bis(3,4-dicarboxyphenoxyphenyl)propane dianhydride (BPANPAN; 0.0011 mole), and 0.24 g pyromellitic dianhydride (PMDA; 0.0011 mole) were weighed into a 25 ml three-neck miniware flask. The flask was then equipped with a stir rod and paddle, a nitrogen inlet and a desiccating outlet tube. A nitrogen purge was established, and 9.3 ml of N-methylpyrrolidone (NMP) was added as stirring was initiated. After 3 hours of stirring, 1.14 ml of the product was withdrawn, diluted to a total volume of 25 ml, and used to determine the inherent viscosity of the polyamic acid. 0.46 ml of pyridine and 0.46 ml of acetic anhydride were added to the remainder of the reaction mixture to imidize the polyamic acid to a polyimide, and the stirring was continued overnight. The product precipitated from solution. It was blended with 300 ml water, filtered, and washed with 100 ml water four times, then dried in a vacuum oven at 138° C. overnight. 0.79 g of solid product was recovered.

The IV of the polyamic acid was 0.65 dl/g. The Tg of the polyimide was found to be 246° C. by DSC. The polyimide could not be dissolved in NMP, a common solvent for engineering resins. This limits the utility of this polymer in applications which require solution processing, such as the formation of fibers and films.

The ready solubility of the polyimide of Example 1 in the solvent, NMP, demonstrates its superiority to the polyimide of Comparative Example A. Copolyimides containing both IPAN and diether dianhydrides can be easily processed in solution either neat or in blends with other polymers to form useful films or fibers. Thus, the copolyimides of this invention not only have higher glass transition temperatures than the homopolymers made from the diether dianhydride alone, but also are soluble in conventional solvents and can be processed in solution.

EXAMPLE 2

BPAPAN/IPAN/OBA

The procedure described in Example 1 was repeated except that oxybisaniline (OBA; 4,4'-diaminodiphenylether) was substituted for mPDA. The amounts of starting materials were 3.67 g OBA (0.0183 mole), 4.76 g BPAPAN (0.00915 mole), and 3.07 g IPAN (0.00913 mole).

The IV's of the polyamic acid and the polyimide were 2.41 dl/g and 1.83 dl/g, respectively. DSC analysis indicated that the Tg of this polyimide was 246° C. whereas the Tg of the homopolymer was reported to be 223° C. (Takekosh et al., Journal of Polymer Science: Polymer Symposium 74, (1986)). Thus, a IPAN/BPAPAN/OBA copolymer of the present invention exhibits a superior Tg when compared to the reported Tg of a corresponding homopolymer.

The thermal decomposition temperatures were determined by a Thermal Gravimetric Analyzer (TGA) attachment with a model 9900 thermal analyzer (available from E. I. DuPont de Nemours & Company, Wilmington, Del.) at a heating rate of 10° C./min. Under a nitrogen atmosphere, the start of catastrophic degradation was at 491° C., 1% additional weight loss was at 509° C., and 10% additional weight loss was at 537° C. Under air, the start of catastrophic degradation was at 446° C., 1% additional weight loss was at 461° C., and 10% additional weight loss was at 515° C. Measurements were made on the polymer as prepared.

EXAMPLE 3

BLEND

Five grams each of the poly(arylether) of Formula (VI)

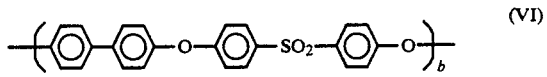

and the polymer obtained in Example 1 (IPAN/BPAPAN/mPDA) were dried overnight in a vacuum oven at 149° C., then placed into a 200 ml Bantamware reaction vessel. 100 ml of NMP was added, and the mixture was stirred overnight to dissolve both polymers. The product was recovered by precipitating in methanol in a blender, filtering, refluxing in methanol, and drying overnight in a vacuum oven at 138° C. The plaque was was hazy, indicative of a two-phase system.

Physical properties of the individual polymers and of the blend are reported in Table I below. The data was obtained from plaques that were compression-molded at 360° C.

TABLE I

| PROPERTY | EXAMPLE 3 | FORMULA VI | EXAMPLE 1 |
|---|---|---|---|
| Tg (°C.)* | 230 & 245 | 226 | 251 |
| Tensile Modulus (psi) | 278,000 | 241,000 | 370,000 |
| Yield Strength (psi) | 12,000 | 10,800 | 0 |
| Tensile Strength (psi) | 12,000 | 10,800 | 14,700 |
| Elongation at Yield (%) | 7.1 | 9.2 | 0 |
| Elongation at Break (%) | 11 | 27 | 5.7 |
| Pendulum Impact (ft. lbs./in$^3$) | 88 | 120 | 22 |

*DMTA method was used to measure Tg

The two separate Tg's reported for Example 3 (Table (I)) indicate that a two-phase blend was obtained. However, it is apparent from the reported physical properties that the two polymers (Formula VI and Example 1) are mechanically compatible and yield an alloy with properties that are essentially intermediate between those of the two components. In other words, the Tg's of the blend are "closer" to each other than those of the pure components.

EXAMPLE 4

BPPAN/IPAN/mPDA

The procedure described in Example 1 was repeated except that 4,4'-(4,4'-biphenylenedioxy)diphthalic anhydride (BPPAN) was substituted for the BPAPAN. The amounts of starting materials were 2.41 g mPDA (0.0223 mole), 3.74 g IPAN (0.0111 mole), and 5.33 g BPPAN (0.0111 mole). The polyimide was precipitated in and washed with water prior to drying in the vacuum oven. The IV's of the polyamic acid and polyimide were 0.54 dl/g and 0.42 dl/g, respectively. DSC analysis indicated that the Tg of this polyimide was 263° C.

COMPARATIVE EXAMPLES B AND C

Three polyimides which did not contain IPAN were prepared by a procedure similar to that described in Example 4. The amounts of starting materials, polyamic acid IV's and Tg's are reported in Table II below.

TABLE II

| | COMPARATIVE EXAMPLES B-D | | | | |
|---|---|---|---|---|---|
| Example | moles BPPAN | moles PMDA | moles mPDA | moles OBA | polyamic acid IV (dl/g) |
| B | 0.0126 | 0.126 | 0.0252 | — | 0.58 |
| C | 0.0105 | 0.0105 | — | 0.0209 | 1.27 |

The polyimides of Comparative Examples B and C precipitated out of solution as they were imidized. In other words, these polymers were not soluble in NMP. Therefore, Comparative Examples B and C cannot be processed in a solution of NMP (a conventional processing solution). On the other hand, the polyimide of Example 4 (containing IPAN) was soluble in NMP.

EXAMPLE 5

BPPAN/IPAN/OBA

The procedure described in Example 4 was repeated except that oxybisaniline (OBA) was substituted for the mPDA. The amounts of starting materials were 3.78 g mPDA (0.0189 mole), 3.18 g IPAN (0.0946 mole), and 5.33 g BPPAN (0.00947 mole). The polyimide was precipitated in, and washed with, water prior to drying in the vacuum oven. The IV's of the polyamic acid and polyimide were 1.14 dl/g and 0.95 dl/g, respectively. DSC analysis indicated that the Tg of this polyimide was 263° C.

EXAMPLE 6

BLEND

A blend of the polymer of Example 4 with the poly(arylether) of Formula (VI) was prepared in a manner similar to that described in Example 3. The composition and Tg's of the blend are reported in Table III below.

EXAMPLE 7

BLEND

A blend of the polyimide of Example 5 with the poly(arylether) of Formula (VI) was prepared in a manner similar to that described in Example 3. The composition and Tg's of the blend are reported in Table III below.

TABLE III

| Example | Example 4 (Wt. %)* | Example 5 (Wt. %) | Formula (VI) (Wt. %) | Tg (°C.)** |
|---|---|---|---|---|
| 6 | 50 | — | 50 | 225 & 261 |
| 7 | — | 50 | 50 | 227 & 260 |

*weight percent of the total polymer
**DSC method was used to measure Tg

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure as those skilled in the art will appreciate.

That which is claimed is:

1. A polymer blend comprising a copolymer having the recurring units

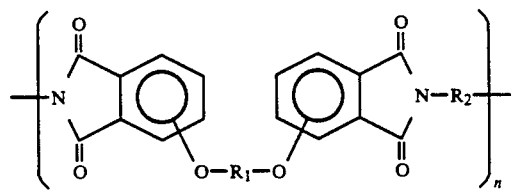

and

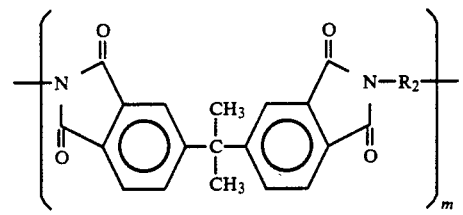

wherein n and m are at least one and the group —O—$R_1$—O— is attached to the 3 or 4 and 3' or 4' positions;

wherein $R_1$ is selected from a substituted or unsubstituted divalent aromatic radical selected from at least one member of the group consisting of

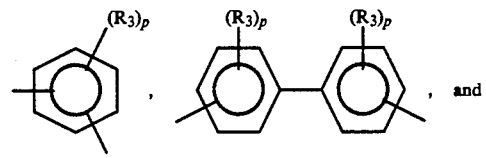, and

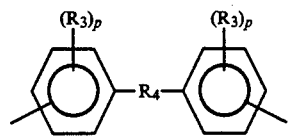

wherein p is from zero to 4, and $R_3$ is independently a monovalent $C_1$ to $C_6$ alkyl, aryl, or halogen with the proviso that $R_1$ is other than

$R_4$ is selected from —O—, —S—,

—SO$_2$—, —SO—, C$_1$ to C$_6$ alkylene, C$_4$ to C$_8$ cycloalkylene, C$_1$ to C$_6$ alkylidene; and $R_2$ is selected from a divalent C$_6$ to C$_{20}$ hydrocarbon radical including halogenated or C$_1$ to C$_6$ alkyl-substituted derivatives thereof, C$_2$ to C$_{20}$ alkylene and cycloalkylene radicals, C$_2$ to C$_8$ alkylene-terminated polydiorganosiloxane, or a divalent radical selected from at least one member of the group consisting of

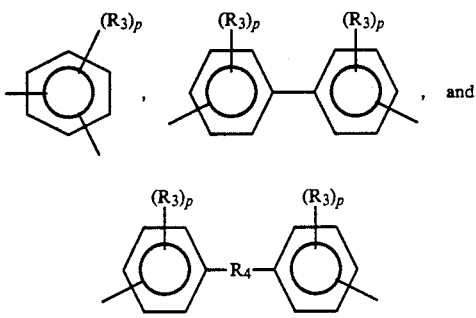

wherein p, R$_3$, and R$_4$ are as defined above and an engineering resin comprising at least one member selected from the group consisting of polyarylate, poly(arylate-carbonate), poly(aryl ether sulfone), and poly(arylether ketone).

2. The polymer blend of claim 1 wherein the poly(arylether sulfone) comprises

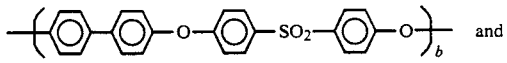

wherein the copolymer is the reaction product of 2,2-bis(3',4'-dicarboxyphenyl)propane dianhydride, a aromatic bis(ether anhydride) selected from at least one member selected from the group consisting of 2,2-bis(3,4-dicarboxyphenoxyphenyl)propane dianhydride and 4,4'-(4,4'-biphenlyenedioxy)diphthalic anhydride, and at least one diamine.

3. The polymer blend of claim 2 wherein the diamine comprises at least one member selected from the group consisting of 4,4'-diaminodiphenylether and m-phenylene diamine.

4. A polymer blend comprising a copolymer formed by the reaction of 2,2-bis(3',4'-dicarboxy-phenyl)propane dianhydride, a aromatic bis(ether anhydride) selected from at least one member selected from the group consisting of 2,2-bis(3,4-dicarboxyphenoxyphenyl)propane dianhydride and 4,4'-(4,4'-biphenlyenedioxy)diphthalic anhydride, and at least one diamine, and an engineering resin comprising at least one member selected from the group consisting of polyarylate, poly(arylate-carbonate), poly(aryl ether sulfone), and poly(arylether ketone).

5. The polymer blend of claim 4 wherein the diamine comprises at least one member selected from the group consisting of 4,4'-diaminodiphenylether and m-phenylene diamine.

6. The polymer blend of claim 1 wherein the poly(arylether sulfone) comprises at least one member selected form the group consisting of

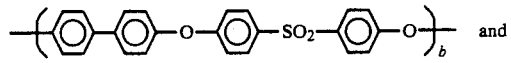

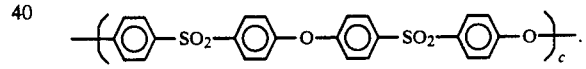

* * * * *

UNITED STATES PATENT AND TRADEMARK OFFICE
CERTIFICATE OF CORRECTION

PATENT NO. : 5,189,115
DATED : February 23, 1993
INVENTOR(S) : John L. Melquist

It is certified that error appears in the above-indentified patent and that said Letters Patent is hereby corrected as shown below:

Column 10, line 4, "Symposium 74, (1986))." should read --Symposium 74, 93 (1986)).--.

Column 10, line 41, "plaque was was hazy" should read --plaque was hazy--.

Signed and Sealed this

Seventh Day of June, 1994

BRUCE LEHMAN

Attest:

Attesting Officer

Commissioner of Patents and Trademarks